United States Patent
Hsu et al.

(10) Patent No.: US 8,284,377 B2
(45) Date of Patent: Oct. 9, 2012

(54) DISPLAY DEVICE AND REPAIRING METHOD THEREFOR

(75) Inventors: Je-Hao Hsu, Hsin-Chu (TW); Wen-Pin Chen, Hsin-Chu (TW); Chiu-Mei Yu, Hsin-Chu (TW); Lee-Hsun Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 485 days.

(21) Appl. No.: 12/553,973

(22) Filed: Sep. 3, 2009

(65) Prior Publication Data

US 2010/0201902 A1    Aug. 12, 2010

(30) Foreign Application Priority Data

Feb. 10, 2009    (TW) ................................ 98104166 A

(51) Int. Cl.
*G02F 1/1333* (2006.01)
*G02F 1/13* (2006.01)
*G02F 1/1345* (2006.01)
*G06F 3/038* (2006.01)
*G09G 3/36* (2006.01)

(52) U.S. Cl. ............ 349/192; 349/54; 349/55; 349/149; 349/152; 345/100; 345/205

(58) Field of Classification Search .................... 349/33, 349/54, 55, 139, 149, 152, 192; 345/87, 345/100, 204, 205, 208, 904; 377/55, 64; 445/2

See application file for complete search history.

(56) References Cited

U.S. PATENT DOCUMENTS

| | | |
|---|---|---|
| 5,768,196 A | 6/1998 | Bloker et al. |
| 6,970,274 B2 | 11/2005 | Morita et al. |
| 2009/0251449 A1* | 10/2009 | Park et al. ..................... 345/208 |

* cited by examiner

*Primary Examiner* — Uyen Chau N Le
*Assistant Examiner* — Michael Mooney
(74) *Attorney, Agent, or Firm* — Chung-Ming Shih

(57) ABSTRACT

In a display device and a repairing method therefor, the display device includes a gate line and two gate-on-array circuits arranged at two sides thereof. Each of the gate-on-array circuits includes a stage coupled to the gate line. Each the stage includes a transistor and a repair circuit. The first source/drain electrode of the transistor is coupled to the gate line, and the second source/drain electrode of the transistor is coupled to receive a clock pulse signal. The repair circuit includes a first terminal coupled to the gate electrode of the transistor, a second terminal coupled to a predetermined potential, and at least one control terminal adapted to receive at least one repair signal to pull the potential on the gate electrode of the transistor to the predetermined potential. The transistor maintains at off-state when the at least one repair signal is supplied to the repair circuit.

30 Claims, 8 Drawing Sheets

US 8,284,377 B2

DISPLAY DEVICE AND REPAIRING METHOD THEREFOR

CROSS-REFERENCE TO RELATED APPLICATIONS

This application is based upon and claims the benefit of priority from the prior Taiwanese Patent Application No. 098104166, filed Feb. 10, 2009, the entire contents of which are incorporated herein by reference.

BACKGROUND

1. Technical Field

The present invention generally relates to display technology fields and, particularly to a display device and a repairing method therefor.

2. Description of the Related Art

A display device such as a liquid crystal device generally includes a display substrate, a gate driving circuit and a source driving circuit. The gate driving circuit and the source driving circuit both are formed on the display substrate. The gate driving circuit is for driving a plurality of gate lines formed on the display substrate. The source driving circuit is for outputting image signals to a plurality of data lines formed on the display substrate. The data lines are arranged intersecting with the gate lines. The gate driving circuit and the source driving circuit may be mounted on the display substrate in the form of a tape carrier package (TCP) or a chip on glass (COG). The gate driving circuit may be formed directly on the display substrate and is termed as gate-on-array circuit. Such a structure in which the gate driving circuit is formed directly on the display substrate includes a shift register having multiple stages cascade-connected with one another. However, when a defect occurs in the gate driving circuit, it is not easy to repair the gate driving circuit because the gate driving circuit is formed directly on the display substrate.

BRIEF SUMMARY

The present invention relates to a display device which is easy to be repaired when a defect occurs in a gate driving circuit thereof.

The present invention further relates to a repairing method for display device, adapted to repair a display device when a defect occurs in a gate driving circuit of the display device.

In order to achieve the above-mentioned advantages, a display device in accordance with an embodiment of the present invention is provided. The display device includes a first gate line and two gate-on-array circuits. The gate-on-array circuits are respectively arranged at two opposite sides of the first gate line. Each of the gate-on-array circuits includes a first stage electrically coupled to the first gate line. Each of the first stages of the gate-on-array circuits includes a first transistor and a repair circuit. The first source/drain electrode of the first transistor is electrically coupled to the first gate line and acts as an output terminal of the first stage, and the second source/drain electrode of the first transistor is electrically coupled to receive a clock pulse signal. The repair circuit includes a first terminal, a second terminal and at least one control terminal. The first terminal is electrically coupled to the gate electrode of the first transistor, the second terminal is electrically coupled to a predetermined potential, and the at least one control terminal is adapted to receive at least one repair signal to pull a potential on the gate electrode of the first transistor to the predetermined potential and thereby the first transistor maintains at off-state when the at least one repair signal is supplied to the repair circuit. The at least one control terminal of the repair circuit is preset to be electrically disconnected with the at least one repair signal.

In one embodiment, the display device further includes a second gate line neighboring with the first gate line, and each of the gate-on-array circuits further includes a second stage neighboring with the first stage and electrically coupled to the second gate line. Each of the second stages of the gate-on-array circuits includes one first transistor and one repair circuit. The first source/drain electrode of the first transistor of the second stage is electrically coupled to the second gate line and acts as an output terminal of the second stage, and the second source/drain electrode of the first transistor of the second stage is electrically coupled to receive another clock pulse signal having an inverted phase with respect to the above-mentioned clock pulse signal.

In one embodiment, each of the first stages of the display device further includes a second transistor, the gate electrode of the second transistor is electrically coupled to the first source/drain electrode of the first transistor of the corresponding second stage, the first source/drain electrode of the second transistor is electrically coupled to the predetermined potential, and the second source/drain electrode of the second transistor is electrically coupled to both the gate electrode and the first source/drain electrode of the first transistor of the first stage.

In one embodiment, each of the second stages of the display device further includes a third transistor, the first source/drain electrode of the third transistor is electrically coupled to the gate electrode of the first transistor of the second stage, and both the gate electrode and the second source/drain electrode of the third transistor are electrically coupled to the first source/drain electrode of the first transistor of the corresponding first stage.

In one embodiment, the repair circuit includes a fourth transistor, the gate electrode of the fourth transistor acts as one control terminal of the repair circuit, the first source/drain electrode of the fourth transistor acts as the second terminal of the repair circuit, and the second source/drain electrode of the fourth transistor acts as the first terminal of the repair circuit. Moreover, the amount of the at least one repair signal is one, and the one repair signal may be an alternating current signal or a direct current signal.

In an alternative embodiment, the repair circuit includes a fifth transistor and a sixth transistor, the gate electrodes of the fifth and sixth transistors act as two control terminals of the repair circuit, the first source/drain electrodes of the fifth and sixth transistors are electrically coupled to the second terminal of the repair circuit, and the second source/drain electrodes of the fifth and sixth transistors are electrically coupled to the first terminal of the repair circuit. Moreover, the amount of the at least one repair signal are two, and the two repair signals respectively are two of the above-mentioned clock pulse signals having inverted phases from each other.

A repairing method for the above-mentioned display device in accordance with an embodiment of the present invention includes the step of: electrically coupling the at least one control terminal of the repair circuit of the first stage of a defective one of the gate-on-array circuits to the at least one repair signal. Furthermore, the repairing method includes the step of: cutting off the electrical connection between the second source/drain electrode of the first transistor of the first stage of the defective gate-on-array circuit and the clock pulse signal.

A display device in accordance with another embodiment of the present invention is provided. The display device includes a plurality of gate lines, a first gate driving circuit and a second gate driving circuit. The first gate driving circuit includes a plurality of cascade-connected stages. The stages of the first gate driving circuit are arranged at a first side of the gate lines and respectively electrically coupled to first terminals of the gate lines. The second gate driving circuit includes a plurality of cascade-connected stages. The stages of the second gate driving circuit are arranged at a second side of the gate lines and respectively electrically coupled to second terminals of the gate lines. Each of the stages of the first and second gate driving circuits includes a first input terminal, a second input terminal, a clock pulse input terminal, an output terminal and at least one repair signal input terminal. The output terminal is for supplying a gate driving signal to enable one of the gate lines. Each of the at least one repair signal input terminal is adapted to receive a repair signal, and the stage is inoperative when the repair signal is electrically coupled to the repair signal input terminal. Moreover, the first input terminal of a front stage of two neighboring stages of the same gate driving circuit is electrically coupled to receive a start pulse, the second input terminal of the front stage is electrically coupled to the output terminal of a rear stage of the two neighboring stages, and the clock pulse input terminal of the front stage is electrically coupled to receive a first clock pulse signal. The first input terminal of the rear stage is electrically coupled to the output terminal of the front stage, and the clock pulse input terminal of the rear stage is electrically coupled to receive a second clock pulse signal having an inverted phase with respect to the first clock pulse signal.

In one embodiment, each of the stages of the first and second gate driving circuits includes a first transistor and a repair circuit. The first source/drain electrode of the first transistor is electrically coupled to the output terminal of the stage, and the second source/drain electrode of the first transistor is electrically coupled to the clock pulse input terminal of the stage. The repair circuit includes a first terminal, a second terminal and at least one control terminal. The first terminal of the repair circuit is electrically coupled to the gate electrode of the first transistor, the second terminal of the repair circuit is electrically coupled to a predetermined potential, and the at least one control terminal of the repair circuit is electrically coupled to the at least one repair signal input terminal to receive the at least one repair signal so as to pull a potential on the gate electrode of the first transistor to the predetermined potential and maintain the first transistor at off-state accordingly.

In one embodiment, each of the stages of the first and second gate driving circuits further includes a second transistor, the first source/drain electrode of the second transistor is electrically coupled to the predetermined potential, the second source/drain electrode of the second transistor is electrically coupled to both the gate electrode and the first source/drain electrode of the first transistor, and the gate electrode of the second transistor is electrically coupled to the second input terminal of the stage.

In one embodiment, each of the stages of the first and second gate driving circuits further includes a third transistor, the first source/drain electrode of the third transistor is electrically coupled to the gate electrode of the first transistor, and both the gate electrode and the second source/drain electrode of the third transistor are electrically coupled to the first input terminal of the stage.

A repairing method for the above-mentioned display device in accordance with an embodiment of the present invention includes the step of: electrically coupling the at least one repair signal input terminal of each of the stages of a defective gate driving circuit of the first and second gate driving circuits to the at least one repair signal. Furthermore, the repairing method includes the steps of: cutting off the electrical connection between the first input terminal of the first stage of the stages of the defective gate driving circuit and the start pulse; and cutting off the electrical connection between the clock pulse input terminal of each of the stages of the defective gate driving circuit and the corresponding one of the first and second clock pulse signals.

A display device in accordance with still another embodiment of the present invention includes a plurality of gate lines, a first gate driving circuit and a second gate driving circuit. The first gate driving circuit includes a plurality of cascade-connected stages. The stages of the first gate driving circuit are arranged at a first side of the gate lines and respectively electrically coupled to first terminals of the gate lines. The second gate driving circuit includes a plurality of cascade-connected stages. The stages of the second gate driving circuit are arranged at a second side of the gate lines and respectively electrically coupled to second terminals of the gate lines. Each of the stages of the first and second gate driving circuits includes a first transistor and a repair circuit. The first source/drain electrode of the first transistor is electrically coupled to a corresponding one of the gate lines and acts as an output terminal of the stage, and the second source/drain electrode of the first transistor is electrically coupled to receive a clock pulse signal. The repair circuit includes a first terminal, a second terminal and at least one control terminal. The first terminal of the repair circuit is electrically coupled to the gate electrode of the first transistor, and the second terminal of the repair circuit is electrically coupled to a predetermined potential. Moreover, the at least one control terminal of the repair circuit of each of the stages of the first gate driving circuit is electrically coupled to receive at least one repair signal. The at least one repair signal enables the repair circuit to pull a potential on the gate electrode of the first transistor to the predetermined potential and thereby the first transistor maintains at off-state. The at least one control terminal of the repair circuit of each of the stages of the second gate driving circuit is preset to be electrically disconnected with the at least one repair signal.

In the above-mentioned embodiments of the present invention, by way of specific designs for the gate driving circuits of the display device, e.g., each of the stages of the gate driving circuits is configured with a repair circuit, when a defect occurs in one of the gate driving circuits of the display device, the stages of the defective gate driving circuit can be made to be inoperative under the control of at least one repair signal supplied thereto. As a result, the purpose of repairing the display device is achieved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
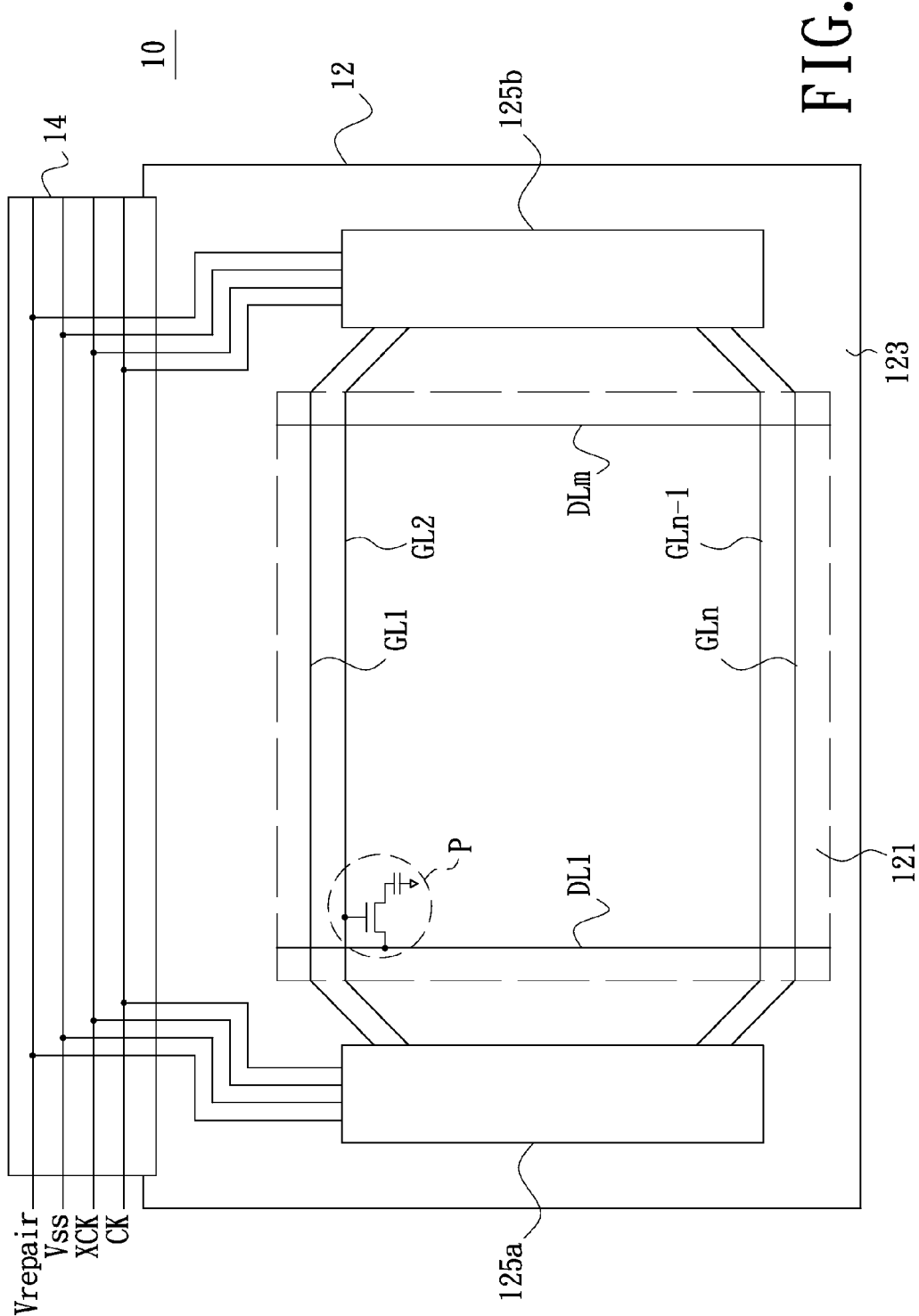
FIG. 1 is a schematic structural view of a display device in accordance with a first embodiment of the present invention.

Referring to FIG. 1, a display device 10 in accordance with a first embodiment of the present invention includes a display substrate 12 and a circuit board 14. The display substrate 12 includes a display area 121 (as denoted by the dashed rectangle in FIG. 1), a peripheral area 123 at the periphery of the display area 121, gate driving circuits 125a, 125b, and a source driving circuit (not shown in FIG. 1). The display area 121 has a plurality of gate lines GL1~GLn, a plurality of data lines DL1~DLm and a plurality of pixels P formed therein. The pixels P are arranged at the respective intersecting locations of the gate lines GL1~GLn and the data lines DL1~DLm. The gate driving circuits 125a, 125b may be formed directly in the peripheral area 123 as two gate-on-array circuits, and the two gate-on-array circuits respectively are formed at two opposite sides of the gate lines GL1~GLn and constitute a dual gate architecture. Two gate driving circuits 125a, 125b are electrically coupled to the gate lines GL1~GLn and for generating gate driving signals to sequentially enable the gate lines GL1~GLn. The source driving circuit is electrically coupled to the data lines DL1~DLm and for supplying image signals to the data lines DL1~DLm. The circuit board 14 is for supplying the gate driving circuits 125a, 125b and the source driving circuit with control signals and power signals. As illustrated in FIG. 1, the circuit board 14 supplies the gate driving circuits 125a, 125b with a clock pulse signal CK, another clock pulse signal XCK (or termed as inverted phase clock pulse signal), a repair signal Vrepair and a power signal Vss (e.g., grounding potential). The repair signal Vrepair may be a direct current signal or an alternating current signal.

Figure 2:
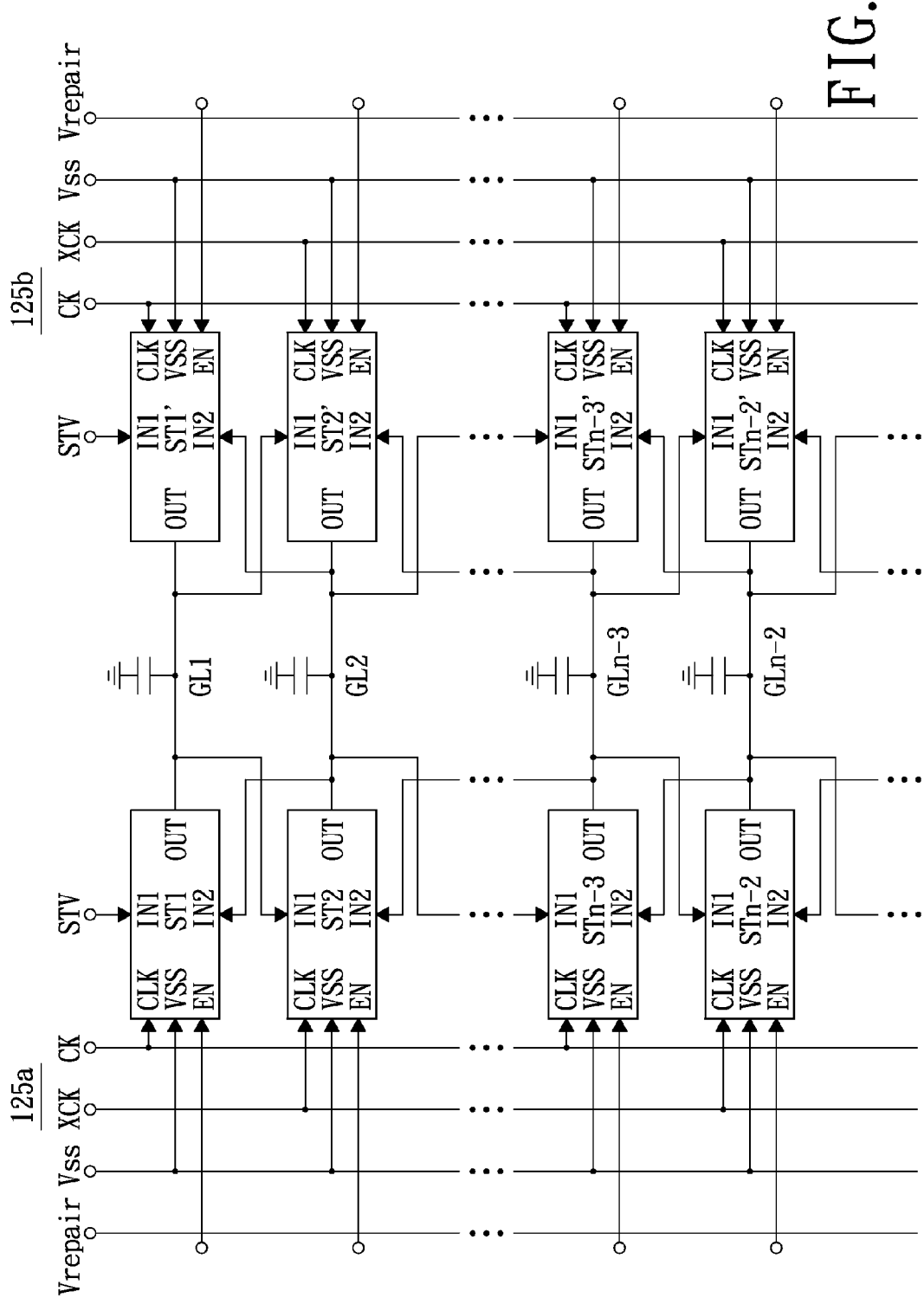
FIG. 2 is a schematic circuit block diagram of gate driving circuits in FIG. 1.

Referring to FIG. 2, showing a circuit block diagram of the two gate driving circuits 125a, 125b. As illustrated in FIG. 2, the gate driving circuit 125a includes a plurality of cascade-connected stages ST1, ST2, ..., STn-3, STn-2, ..., and the cascade-connected stages are arranged at the left side of the gate lines GL1, GL2, ..., GLn-3, GLn-2, ... and respectively electrically coupled to left terminals of the gate lines. Likewise, the gate driving circuit 125b includes a plurality of cascade-connected stages ST1', ST2', ..., STn-3', STn-2', ... and the cascade-connected stages are arranged at the right side of the gate lines GL1, GL2, ..., GLn-3, GLn-2, ... and respectively electrically coupled to right terminals of the gate lines.

Each of the stages of the gate driving circuit 125a includes input terminals IN1, IN2, a clock pulse input terminal CLK, an output terminal OUT, a repair signal input terminal EN and a power supply terminal VSS. The output terminal OUT is for supplying a gate driving signal to enable a corresponding one of the gate lines. The power supply terminal VSS is electrically coupled to receive the power signal Vss. The repair signal input terminal EN is adapted to receive the repair signal Vrepair and the stage is inoperative when the repair signal input terminal EN is electrically coupled with the repair signal Vrepair, and thereby the output terminal OUT no longer supplies the gate driving signal to enable the corresponding one of the gate lines. The repair signal input terminal EN is preset to be electrically disconnected with the repair signal Vrepair. The input terminal IN1 of the first stage ST1 of the cascade-connected stages is supplied with a start pulse STV, and the input terminal IN1 of the other stages of the cascade-connected stages are electrically coupled to the output terminals OUT of respective front stages so as to receive such start pulses from the respective front stages.

With regard to any two neighboring stages of the gate driving circuit 125a, stages STn-3, STn-2 are taken as an example for the purpose of illustration. In particular, the clock pulse input terminal CLK of the front stage STn-3 is supplied with the clock pulse signal CK, and the input terminal IN2 of the front stage STn-3 is electrically coupled to the output terminal OUT of the rear stage STn-2. The clock pulse input terminal CLK of the rear stage STn-2 is supplied with the clock pulse signal XCK having an inverted phase with respect to the clock pulse signal CK, and the input terminal IN1 of the rear stage STn-2 is electrically coupled to the output terminal OUT of the front stage STn-3.

Each of the stages of the gate driving circuit 125b includes input terminals IN1, IN2, a clock pulse input terminal CLK, an output terminal OUT, a repair signal input terminal EN and a power supply terminal VSS. Electrical connections of respective stages of the gate driving circuit 125b are similar to that of respective stages of the gate driving circuit 125a, and thus will not be repeated herein.

Figure 3:
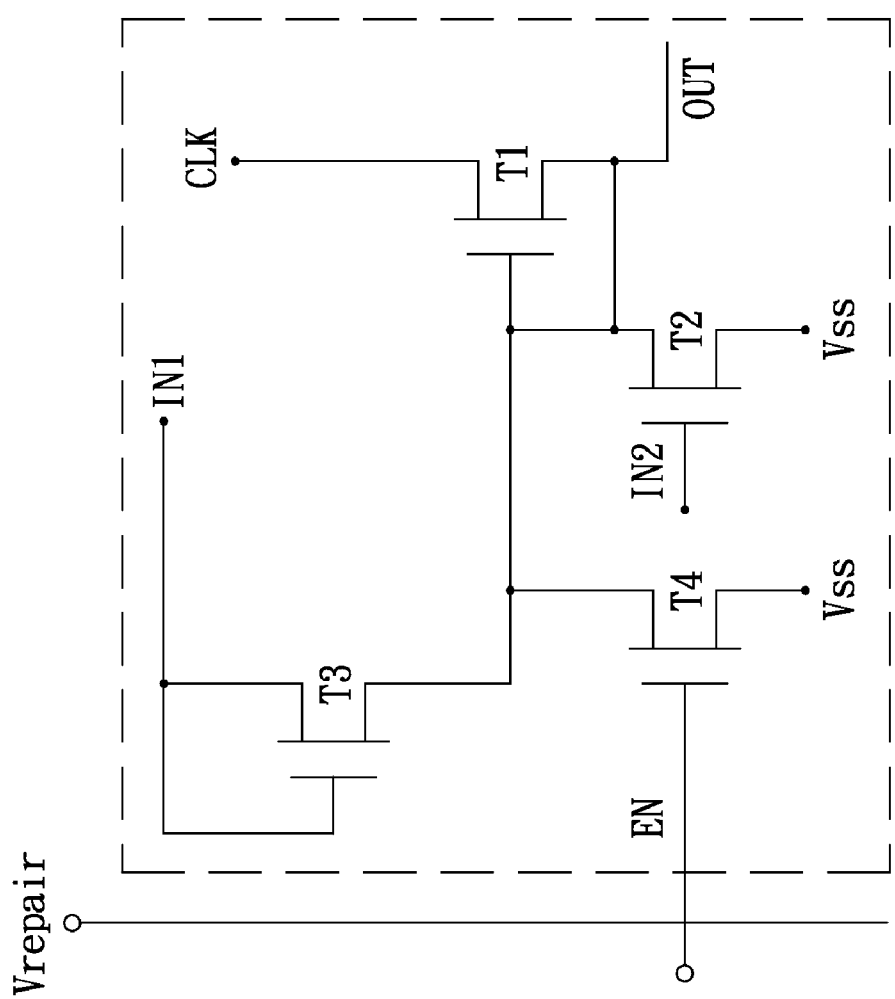
FIG. 3 is a circuit connection diagram of any one of stages in FIG. 2.

Referring to FIG. 3, showing a circuit connection diagram of any one of the stages of the gate driving circuits 125a, 125b. As illustrated in FIG. 3, the stage includes transistors T1, T2, T3 and T4. The source electrode of the transistor T1 is electrically coupled to the output terminal OUT of the stage, the drain electrode of the transistor T1 is electrically coupled to the clock pulse input terminal CLK of the stage. The transistor T2 functions as a pull low circuit, the source electrode of the transistor T2 is electrically coupled to a predetermined potential for example the grounding potential Vss, the drain electrode of the transistor T2 is electrically coupled to both the gate electrode and source electrode of the transistor T1, and the gate electrode of the transistor T2 is electrically coupled to the input terminal IN2 of the stage. As well-known to the skilled person in the art, the level of the predetermined potential is relevant to the type of the transistor T1, for example, the transistor T1 in the illustrated embodiment is a N-type field effect transistor and correspondingly the predetermined potential is the grounding potential Vss. The source electrode of the transistor T3 is electrically coupled to the gate electrode of the transistor T1, and both the gate electrode and drain electrode of the transistor T3 are electrically coupled to the input terminal IN1 of the stage. The transistor T4 functions as a repair circuit, the drain electrode of the transistor T4 acts as a first terminal of the repair circuit and is electrically coupled to the gate electrode of the transistor T1, the source electrode of the transistor T4 acts as a second terminal of the repair circuit and is electrically coupled to the predetermined potential for example grounding potential, and the gate electrode of the transistor T4 acts as a control terminal of the repair signal and is electrically coupled to the repair signal input terminal EN of the stage. When the repair signal Vrepair is supplied to the repair signal input terminal EN, the transistor T4 is turn on, the potential on the gate electrode of the transistor T1 is pulled to the predetermined potential and thereby the transistor T1 maintains at off-state so that the stage becomes inoperative.

Figure 4:
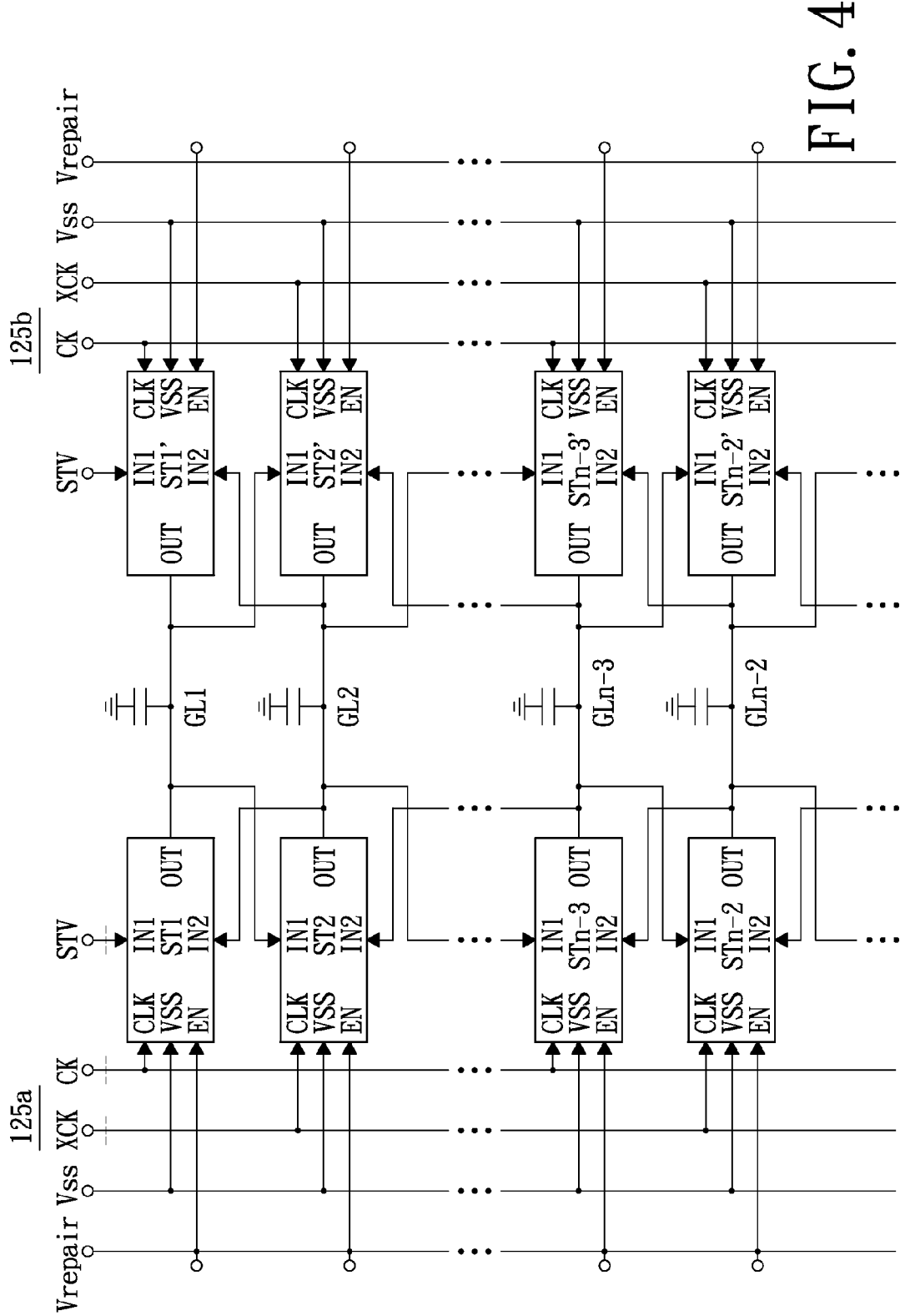
FIG. 4 is a schematic circuit block diagram of gate driving circuits of the display device in FIG. 1 after the display device is repaired.

Referring to FIG. 4, a repairing method for the above-mentioned display device 10 will be described below in detail. FIG. 4 shows a circuit block diagram of the gate driving circuits 125a, 125b of repaired display device 10. In particular, when a defect occurs in one of the gate driving circuits 125a, 125b of the display device 10, for example, the gate driving circuit 125a is defective, the repair signal input terminal EN of each of the stages of the defective gate driving circuit 125a is expected to be coupled with the repair signal Vrepair (as illustrated in FIG. 4) so as to make the first transistor T1 of each of the stages to maintain at off-state and thereby the stages become inoperative. Furthermore, the electrical connection between the input terminal IN1 of the first stage ST1 of the defective gate driving circuit 125 and the start pulse STV is expected to be cut off (as denoted by a dashed line in FIG. 4) by a laser beam, and the electrical connection between the clock pulse input terminal CLK of each of the stages of the defective gate driving circuit 125a and a corresponding one of the clock pulse signals CK, XCK is expected to be cut off (as denoted by another dashed line in FIG. 4) by a laser beam.

As seen from FIG. 4, the repair signal input terminal EN of each of the cascade-connected stages of the defective gate driving circuit 125a is electrically coupled with the repair signal Vrepair, on the contrary, the repair signal input terminal EN of each of the cascade-connected stages of the gate driving circuit 125b is electrically disconnected with the repair signal Vrepair. Moreover, the clock pulse input terminal CLK of each of the stages of the defective gate driving circuit 125a is electrically disconnected with the corresponding one of the clock pulse signals CK, XCK (i.e., the drain electrode of the transistor T1 is electrically disconnected with the corresponding one of the clock pulse signals CK, XCK), but the clock pulse input terminal CLK of each of the stages of the gate driving circuit 125b is electrically coupled to the corresponding one of the clock pulse signals CK, XCK.

In the above-mentioned first embodiment of the present invention, an additional signal is needed to be provided as the repair signal Vrepair for making the stages of the defective gate driving circuit to be inoperative, however, in another embodiment of the present invention, inherent signals of the display device are used as such repair signals and thus it is unnecessary to provide the additional signal, e.g., the below detailed description in accordance with a second embodiment of the present invention.

Figure 5:
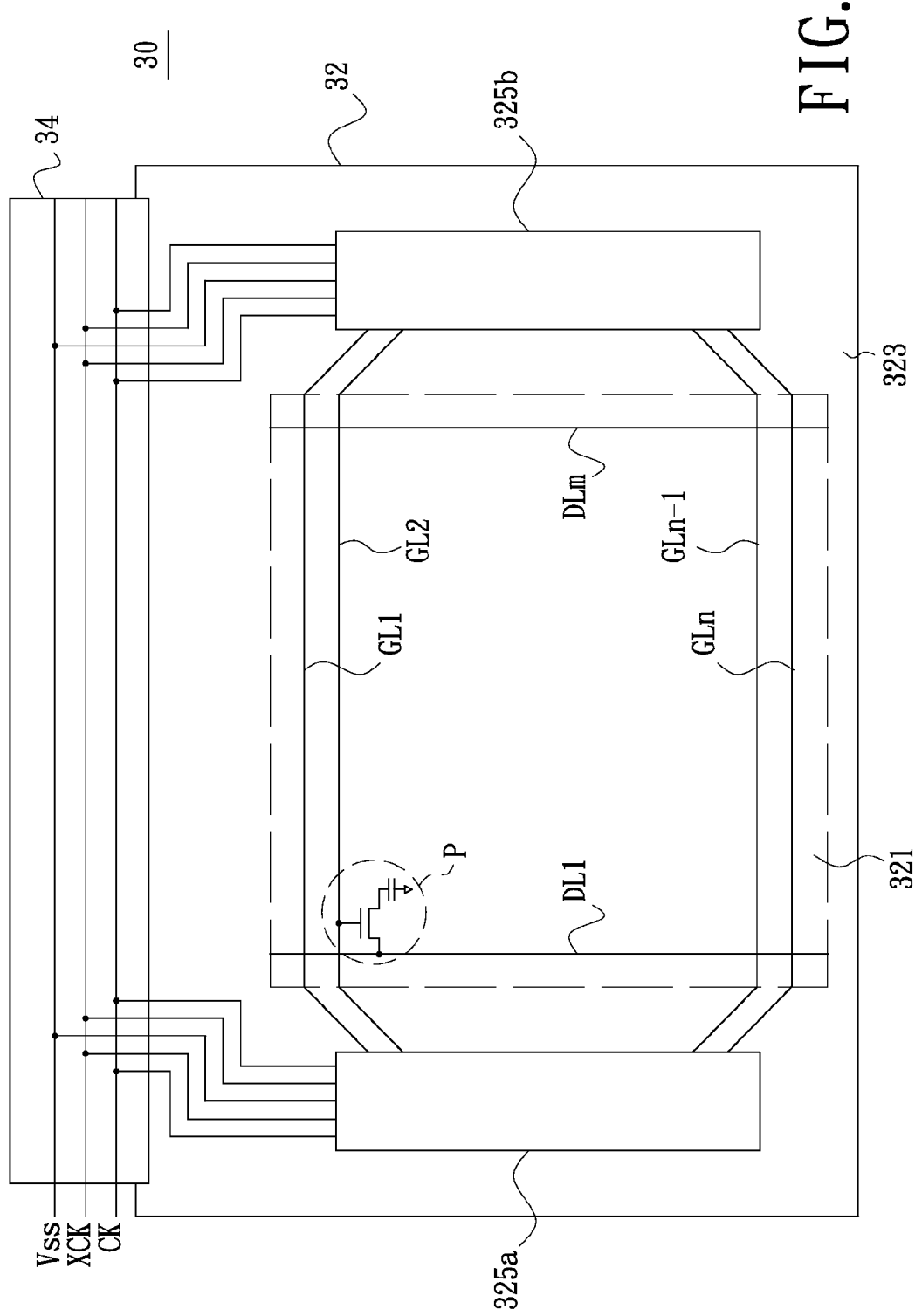
FIG. 5 is a schematic structural view of a display device in accordance with a second embodiment of the present invention.

Referring to FIG. 5, a display device 30 in accordance with the second embodiment of the present invention includes a display substrate 32 and a circuit board 34. The display substrate 32 includes a display area 321 (as denoted by the dashed rectangle in FIG. 5), a peripheral area 323 at the periphery of the display area 321, gate driving circuits 325a, 325b and a source driving circuit (not shown in FIG. 5). The display area 321 has a plurality of gate lines GL1~GLn, a plurality of data lines DL1~DLm and a plurality of pixels P formed therein. The pixels P are arranged at the respective intersecting locations of the gate lines GL1~GLn and the data lines DL1~DLm. The gate driving circuits 325a, 325b may be formed directly in the peripheral area 323 as two gate-on-array circuits, and the two gate-on-array circuits respectively are arranged at two opposite sides of the gate lines GL1~GLn and constitute a dual gate architecture. The gate driving circuits 325a, 325b are electrically coupled to the gate lines GL1~GLn and for generating gate driving signals to sequentially enable the gate lines GL1~GLn. The source driving circuit is electrically coupled to the data lines DL1~DLm and for supplying image signals to the data lines DL1~DLm. The circuit board 34 is for supplying the gate driving circuits 325a, 325b and the source driving circuit with control signals and power signals. In the illustrated embodiment, the circuit board 34 as illustrated in FIG. 5 supplies the gate driving circuits 325a, 325b with clock pulse signals CK, XCK and a power signal Vss. Moreover, the clock pulse signals CK, XCK also act as repair signals in the illustrated embodiment.

Figure 6:
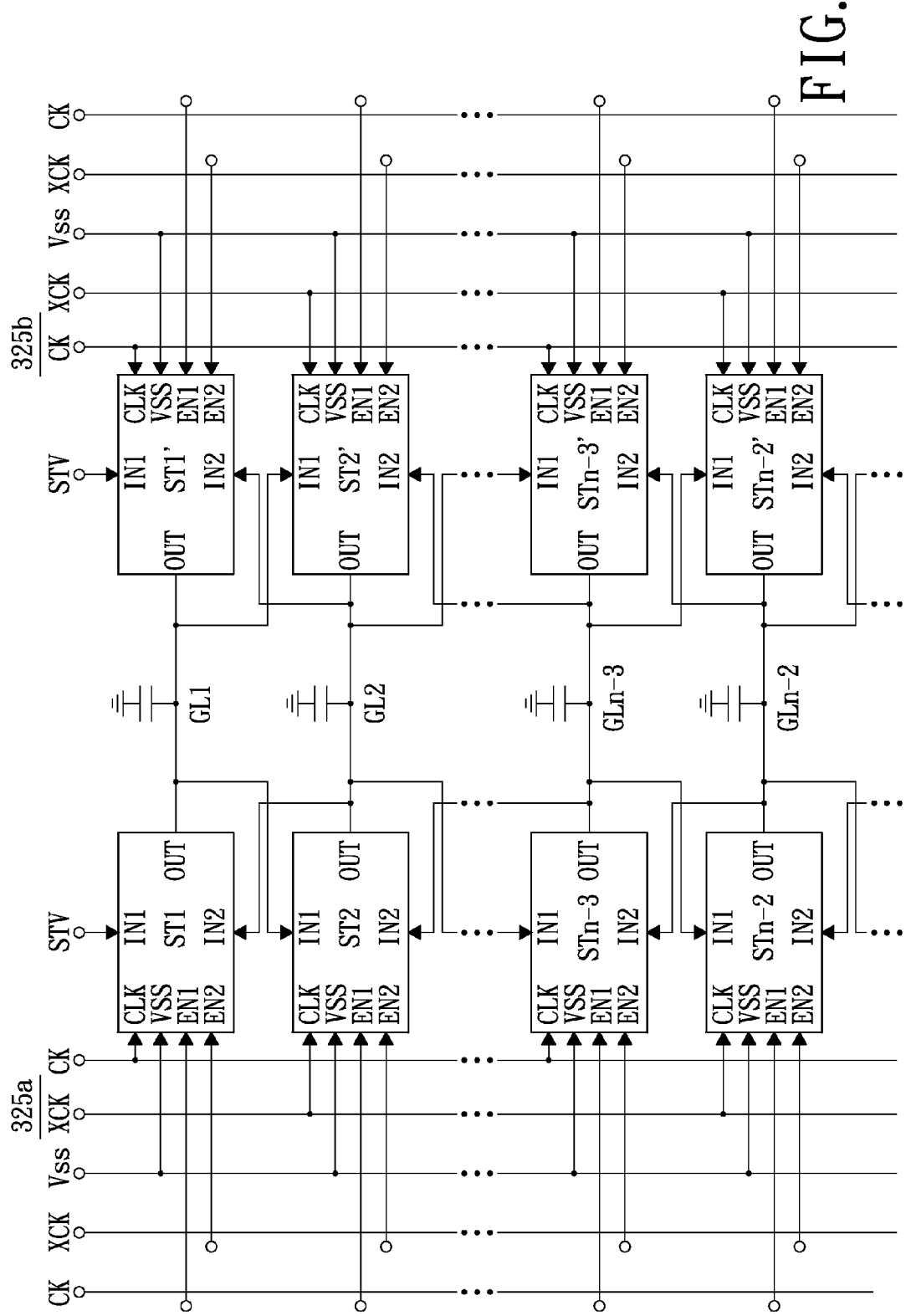
FIG. 6 is a schematic circuit block diagram of gate driving circuits in FIG. 5.

Referring to FIG. 6, showing a circuit block diagram of the gate driving circuits 325a, 325b. As illustrated in FIG. 6, the gate driving circuit 325a includes a plurality of cascade-connected stages ST1, ST2, ..., STn-3, STn-2, ..., and the cascade-connected stages are arranged at the left side of the gate lines GL1, GL2, ..., GLn-3, GLn-2, ... and respectively electrically coupled to left terminals of the gate lines. Likewise, the gate driving circuit 325b includes a plurality of cascade-connected stages ST1', ST2', ..., STn-3', STn-2', ..., and the cascade-connected stages are arranged at the right side of the gate lines GL1, GL2, ..., GLn-3, GLn-2, and respectively electrically coupled to right terminals of the gate lines.

Each of the stages of the gate driving circuit 325a includes input terminals IN1, IN2, a clock pulse input terminal CLK, an output terminal OUT, repair signal input terminals EN1, EN2 and a power supply terminal VSS. The output terminal OUT is for supplying a gate driving signal to enable a corresponding one of the gate lines. The power supply terminal VSS is electrically coupled to receive the power signal Vss. The repair signal input terminals EN1, EN2 are respectively adapted to receive the clock pulse signals CK, XCK, and the stage becomes inoperative when the repair signal input terminals EN1, EN2 are respectively electrically coupled with the clock pulse signals CK, XCK and thereby the output terminal OUT no longer supplies the gate driving signal to enable the corresponding one of the gate lines. The repair signal input terminals EN1, EN2 are respectively preset to be electrically disconnected with the clock pulse signals CK, XCK. The input terminal IN1 of the first stage ST1 of the cascade-connected stages is supplied with a start pulse STV, and the input terminals IN1 of the other stages are electrically coupled to the output terminals OUT of respective front stages so as to receive such start pulses from the respective front stages.

Likewise, each of the stages of the gate driving circuit 325b includes input terminals IN1, IN2, a clock pulse input terminal CLK, an output terminal OUT, repair signal input terminals EN1, EN2 and a power supply terminal VSS. Electrical connections of respective stages of the gate driving circuit 325b are similar to that of respective stages of the gate driving circuit 325a and thus will not be repeated herein.

Figure 7:
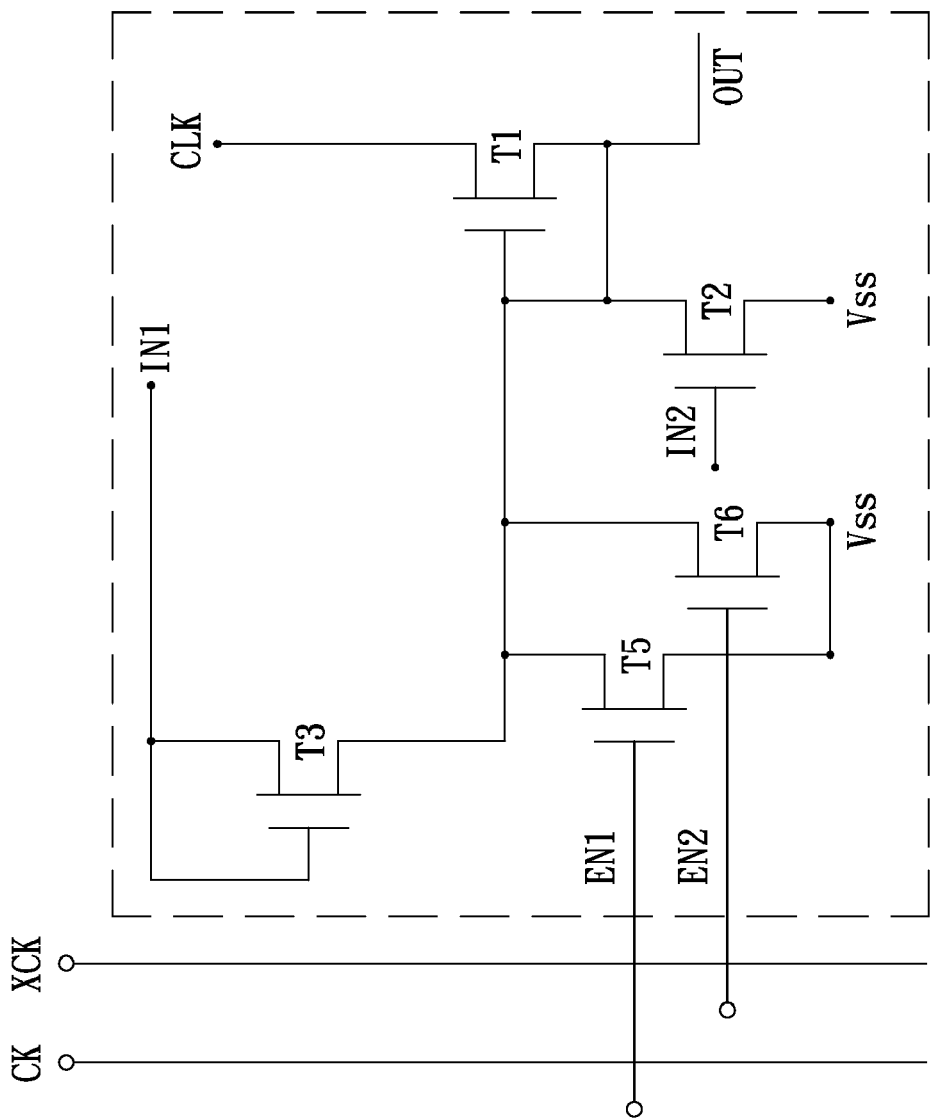
FIG. 7 is a circuit connection diagram of any one of stages in FIG. 6.

Referring to FIG. 7, showing a circuit connection diagram of any one of the stages of the gate driving circuits 325a, 325b. As illustrated in FIG. 7, the stage includes transistors T1, T2, T3, T5 and T6. The source electrode of the transistor T1 is electrically coupled to the output terminal OUT of the stage, and the drain electrode of the transistor T1 is electrically coupled to the clock pulse input terminal CLK of the stage. The transistor T2 functions as a pull low circuit, the source electrode of the transistor T2 is electrically coupled to a predetermined potential (i.e., a grounding potential Vss in the present embodiment), the drain electrode of the transistor T2 is electrically coupled to both the gate electrode and source electrode of the transistor T1, and the gate electrode of the transistor T2 is electrically coupled to the input terminal IN2 of the stage. The source electrode of the transistor T3 is electrically coupled to the gate electrode of the transistor T1, and both the gate electrode and drain electrode of the transistor T3 are electrically coupled to the input terminal IN1 of the stage. The transistors T5 and T6 together constitute a repair circuit, the drain electrodes of the transistors T5, T6 act as a first terminal of the repair circuit and are electrically coupled to the gate electrode of the transistor T1, the source electrodes of the transistors T5, T6 act as a second terminal of the repair circuit and are electrically coupled to the predetermined potential (i.e., the grounding potential Vss in the present embodiment), and the gate electrodes of the transistors T5, T6 act as two control terminals of the repair circuit and respectively are electrically coupled to the repair signal input terminals EN1, EN2 of the stage. When the clock pulse signals CK, XCK are respectively supplied to the repair signal input terminals EN1, EN2, the transistors T5, T6 are alternately turn on, and thereby the potential on the gate electrode of the transistor T1 is continuously pulled to the predetermined potential and the transistor T1 maintains at off-state so that the stage is inoperative.

Figure 8:
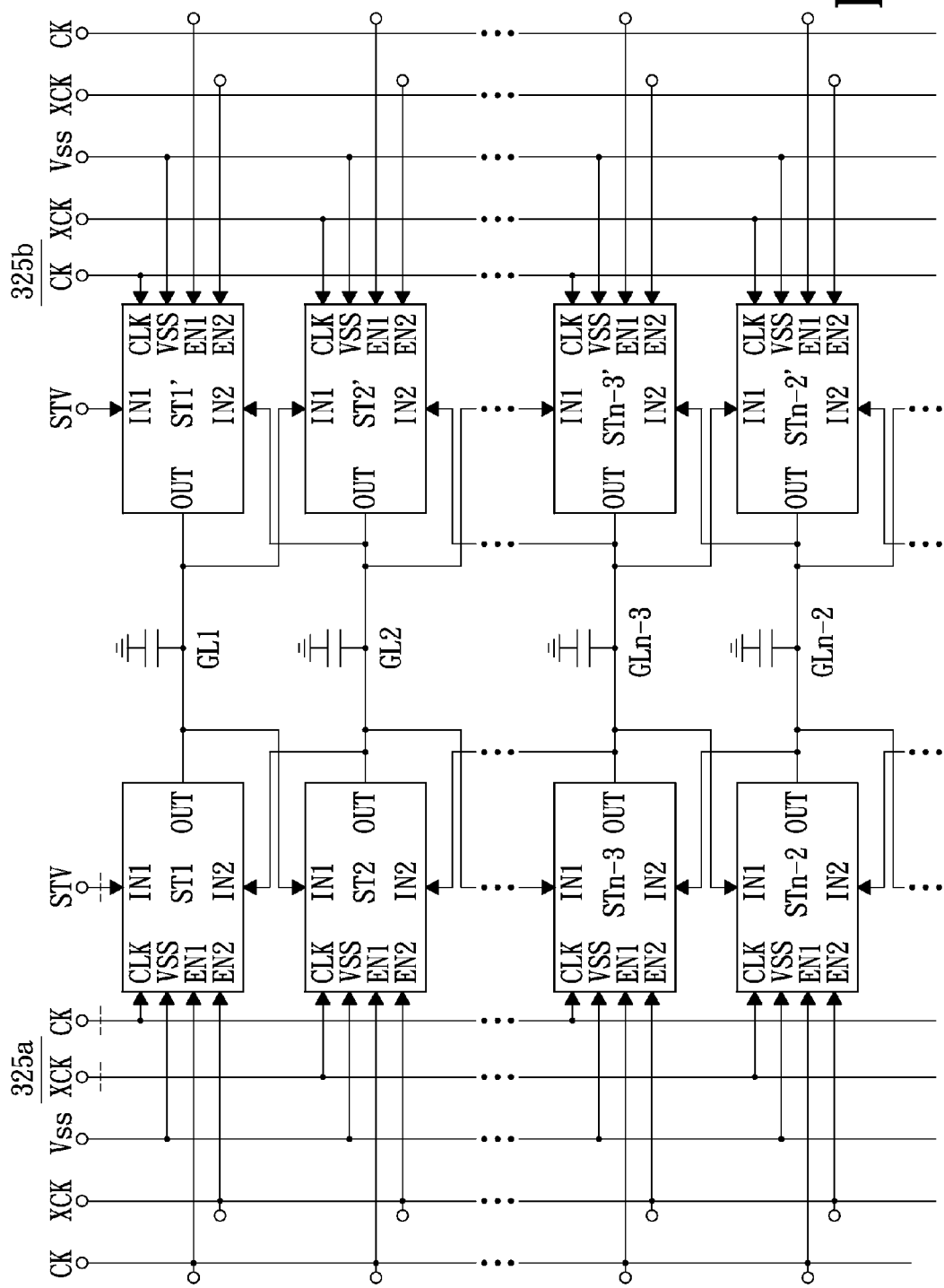
FIG. 8 is a schematic circuit block diagram of gate driving circuits of the display device in FIG. 5 after the display device is repaired.

Referring to FIG. 8, a repairing method for the above-mentioned display device 30 will be described below in detail. FIG. 8 shows a circuit block diagram of the gate driving circuits 325a, 325b of repaired display device 30. More specifically, when a defect occurs in one of the gate driving circuits 325a, 325b of the display device 30, for example the gate driving circuit 325a is defective, the repair signal input terminals EN1, EN2 of each of the stages of the defective gate driving circuit 325a respectively are expected to be electrically coupled with the clock pulse signals CK, XCK (as illustrated in FIG. 8), to maintain the transistor T1 of each of the stages at off-state and thereby the stages are inoperative. Furthermore, the electrical connection between the input terminal IN1 of the first stage ST1 of the defective gate driving circuit 325a and the start pulse STV is expected to be cut off (as denoted by a dashed line in FIG. 8), and the electrical connection between the clock pulse input terminal CLK of each of the stages of the defective gate driving circuit 325a and the corresponding one of the clock pulse signals CK, XCK is expected to be cut off (as denoted by another dashed line in FIG. 8). The above-mentioned cut off of electrical connections can be performed by laser cutting.

As seen from FIG. 8, the repair signal input terminals EN1, EN2 of each of the stages of the defective gate driving circuits 325a are respectively electrically coupled to the clock pulse signals CK, XCK, on the contrary, the repair signal input terminals EN1, EN2 of each of the stages of the gate driving circuit 325b respectively are preset to be electrically disconnected with the clock pulse signals CK, XCK. Moreover, the clock pulse input terminal CLK of each of the stages of the defective gate driving circuit 325a is electrically disconnected with the corresponding one of the clock pulse signals CK, XCK (i.e., the drain electrode of the transistor T1 is electrically disconnected with the corresponding one of the clock pulse signals CK, XCK), but the clock pulse input terminal CLK of each of the stages of the gate driving circuit 325b is electrically coupled with the corresponding one of the clock pulse signals CK, XCK.

In summary, in the above-mentioned embodiments of the present invention, by way of specific designs for the gate driving circuits of the display device, e.g., each of the stages of the gate driving circuits is configured with a repair circuit, when a defect occurs in one of the gate driving circuits of the display device, the stages of the defective gate driving circuit can be made to be inoperative under the control of at least one repair signal supplied thereto. As a result, the purpose of repairing the display device is achieved. In addition, in the above-mentioned embodiments, when a defect occurs in one gate driving circuit, by way of supplying at least one repair signal to make the stages of the defective gate driving circuit to be inoperative, the defective gate driving circuit would be inoperative in whole. Accordingly, the defect of H-weak line or H-weak block in displayed images caused by a case of local repair to the defective gate driving circuit can be effectively improved.

In addition, the skilled person in the art can make some modifications with respect to the display devices and the repairing methods in the above-mentioned embodiments, for example, suitably changing the circuit structural configuration(s) of the repair circuit and/or the pull low circuit, and/or interchanging the connections of the source electrodes and the drain electrodes of respective transistors, and so on.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device comprising:
   a first gate line; and
   two gate-on-array circuits arranged at two opposite sides of the first gate line, each of the gate-on-array circuits comprising a first stage electrically coupled to the first gate line;
   wherein each of the first stages comprises:
      a first transistor, the first source/drain electrode of the first transistor being electrically coupled to the first gate line and acts as an output terminal of the first stage, and the second source/drain electrode of the first transistor being electrically coupled to receive a clock pulse signal; and
      a repair circuit including a first terminal, a second terminal and at least one control terminal, the first terminal of the repair circuit being electrically coupled to the gate electrode of the first transistor, the second terminal of the repair circuit being electrically coupled to a predetermined potential, and the at least one control terminal of the repair circuit being adapted to receive at least one repair signal to pull a potential on the gate electrode of the first transistor to the predetermined potential and thereby the first transistor is maintained at off-state when the at least one repair signal is supplied to the repair circuit, the at least one control terminal being preset to be electrically disconnected with the at least one repair signal.

2. The display device as claimed in claim 1, further comprising a second gate line neighboring with the first gate line, and each of the gate-on-array circuits further comprising a second stage neighboring with the first stage and electrically coupled to the second gate line; wherein each of the second stages comprises one first transistor and one repair circuit, the first source/drain electrode of the first transistor of the second stage is electrically coupled to the second gate line and acts as an output terminal of the second stage, and the second source/drain electrode of the first transistor of the second stage is electrically coupled to receive another clock pulse signal having an inverted phase with respect to the clock pulse signal.

3. The display device as claimed in claim 2, wherein each of the first stages further comprises a second transistor, the gate electrode of the second transistor is electrically coupled to the first source/drain electrode of the first transistor of the corresponding second stage, the first source/drain electrode of the second transistor is electrically coupled to the predetermined potential, and the second source/drain electrode of the second transistor is electrically coupled to both the gate electrode and the first source/drain electrode of the first transistor of the first stage.

4. The display device as claimed in claim 3, wherein each of the second stages further comprises a third transistor, the first source/drain electrode of the third transistor is electrically coupled to the gate electrode of the first transistor the second stage, and both the gate electrode and the second source/drain electrode of the third transistor are electrically coupled to the first source/drain electrode of the first transistor of the corresponding first stage.

5. The display device as claimed in claim 1, wherein the repair circuit comprises a fourth transistor, the gate electrode of the fourth transistor acts as one control terminal of the repair circuit, the first source/drain electrode of the fourth transistor acts as the second terminal of the repair circuit, and the second source/drain electrode of the fourth transistor acts as the first terminal of the repair circuit.

6. The display device as claimed in claim 5, wherein the amount of the at least one repair signal is one, and the one repair signal is a direct current signal.

7. The display device as claimed in claim 5, wherein the amount of the at least one repair signal is one, and the one repair signal is an alternating current signal.

8. The display device as claimed in claim 1, wherein the repair circuit comprises a fifth transistor and a sixth transistor, the gate electrodes of the fifth and sixth transistors act as two control terminals of the repair circuit, the first source/drain electrodes of the fifth and sixth transistors are electrically coupled to the second terminal of the repair circuit, and the second source/drain electrodes of the fifth and sixth transistors are electrically coupled to the first terminal of the repair circuit.

9. The display device as claimed in claim 8, wherein the amount of the at least one repair signal is two, and the two repair signals respectively are the clock pulse signal and another clock pulse signal having an inverted phase with respect to the clock pulse signal.

10. A repairing method for the display device as claimed in claim 1, comprising:
electrically coupling the at least one control terminal of the repair circuit of the first stage of a defective one of the gate-on-array circuit to the at least one repair signal.

11. The repairing method as claimed in claim 10, further comprising:
cutting off the electrical connection between the second source/drain electrode of the first transistor of the first stage of the defective gate-on-array circuit and the clock pulse signal.

12. The repairing method as claimed in claim 10, wherein the amount of the at least one repair signal is one, and the one repair signal is one of a direct current signal and an alternating current signal.

13. The repairing method as claimed in claim 10, wherein the amount of the at least one repair signal is two, and the two repair signals respectively are the clock pulse signal and another clock pulse signal having an inverted phase with respect to the clock pulse signal.

14. A display device comprising:
a plurality of gate lines;
a first gate driving circuit comprising a plurality of cascade-connected stages, the stages of the first gate driving circuit being arranged at a first side of the gate lines and respectively electrically coupled to first terminals of the gate lines; and
a second gate driving circuit comprising a plurality of cascade-connected stages, the stages of the second gate driving circuit being arranged at a second side of the gate lines and respectively electrically coupled to second terminals of the gate lines;
wherein each of the stages of the first and second gate driving circuits comprises a first input terminal, a second input terminal, a clock pulse input terminal, an output terminal and at least one repair signal input terminal, the output terminal is for supplying a gate driving signal to enable one of the gate lines, the at least one repair signal input terminal is adapted to receive at least one repair signal, and the stage is inoperative when the at least one repair signal input terminal is electrically coupled with the at least one repair signal;
wherein the first input terminal of a front stage of two neighboring stages of the same gate driving circuit is electrically coupled to receive a start pulse, the second input terminal of the front stage is electrically coupled to the output terminal of a rear stage of the two neighboring stages, the clock pulse input terminal of the front stage is electrically coupled to receive a first clock pulse signal, the first input terminal of the rear stage is electrically coupled to the output terminal of the front stage, and the clock pulse input terminal of the rear stage is electrically coupled to receive a second clock pulse signal having an inverted phase with respect to the first clock pulse signal.

15. The display device as claimed in claim 14, wherein each of the stages of the first and second gate driving circuits comprises a first transistor and a repair circuit, the first source/drain electrode of the first transistor is electrically coupled to the output terminal of the stage, the second source/drain electrode of the first transistor is electrically coupled to the clock pulse input terminal of the stage, the repair circuit comprises a first terminal, a second terminal and at least one control terminal, the first terminal of the repair circuit is electrically coupled to the gate electrode of the first transistor, the second terminal of the repair circuit is electrically coupled to a predetermined potential, and the at least one control terminal of the repair circuit is electrically coupled with the at least one repair signal input terminal of the stage and adapted to receive the at least one repair signal to pull a potential on the gate electrode of the first transistor to the predetermined potential and maintain the first transistor at off-state accordingly.

16. The display device as claimed in claim 15, wherein each of the stages of the first and second gate driving circuits further comprises a second transistor, the first source/drain electrode of the second transistor is electrically coupled to the predetermined potential, the second source/drain electrode of the second transistor is electrically coupled to both the gate electrode and the first source/drain electrode of the first transistor, and the gate electrode of the second transistor is electrically coupled to the second input terminal of the stage.

17. The display device as claimed in claim 16, wherein each of the stages of the first and second gate driving circuits further comprises a third transistor, the first source/drain electrode of the third transistor is electrically coupled to the gate electrode of the first transistor, and both the gate electrode and the second source/drain electrode of the third transistor are electrically coupled to the first input terminal of the stage.

18. The display device as claimed in claim 15, wherein the repair circuit comprises a fourth transistor, the gate electrode of the fourth transistor acts as one control terminal of the repair circuit, the first source/drain electrode of the fourth transistor acts as the second terminal of the repair circuit, and the second source/drain electrode of the fourth transistor acts as the first terminal of the repair circuit.

19. The display device as claimed in claim 18, wherein the amount of the at least one repair signal is one, and the one repair signal is a direct current signal.

20. The display device as claimed in claim 18, wherein the amount of the at least one repair signal is one, and the one repair signal is an alternating current signal.

21. The display device as claimed in claim 15, wherein the repair circuit comprises a fifth transistor and a sixth transistor, the gate electrodes of the fifth and sixth transistors act as two control terminals of the repair circuit, the first source/drain electrodes of the fifth and sixth transistors are electrically coupled to the second terminal of the repair circuit, the second source/drain electrodes of the fifth and sixth transistors are electrically coupled to the first terminal of the repair circuit, the amount of the at least one repair signal is two, and the two repair signals respectively are the first clock pulse signal and the second clock pulse signal.

22. A display device comprising:
a plurality of gate lines;
a first gate driving circuit comprising a plurality of cascade-connected stages, the stages of the first gate driving circuit being arranged at a first side of the gate lines and respectively electrically coupled to first terminals of the gate lines; and
a second gate driving circuit comprising a plurality of cascade-connected stages, the stages of the second gate driving circuit being arranged at a second side of the gate lines and respectively electrically coupled to second terminals of the gate lines;
wherein each of the stages of the first and second gate driving circuits comprises:
a first transistor, the first source/drain electrode of the first transistor being electrically coupled to a corresponding one of the gate lines and acts an output terminal of the stage, and the second source/drain electrode of the first transistor being electrically coupled to receive a clock pulse signal; and
a repair circuit including a first terminal, a second terminal and at least one control terminal, the first terminal of the repair circuit being electrically coupled to the gate electrode of the first transistor, and the second terminal of the repair circuit being electrically coupled to a predetermined potential;
wherein the at least one control terminal of the repair circuit of each of the stages of the first gate driving circuit is electrically coupled to receive at least one repair signal, the at least one repair signal enables the repair circuit to pull a potential on the gate electrode of the first transistor of the stage to the predetermined potential and thereby the first transistor maintains at off-state, the at least one control terminal of the repair circuit of each of the stages of the second gate driving circuit is electrically disconnected with the at least one repair signal.

23. The display device as claimed in claim 22, wherein the second source/drain electrode of the first transistor of each of the stages of the first gate driving circuit is electrically disconnected with the clock pulse signal, but the second source/drain electrode of the first transistor of each of the stages of the second gate driving circuit is electrically coupled with the clock pulse signal.

24. The display device as claimed in claim 22, wherein each of the stages of the first and second gate driving circuits further comprises a second transistor, the gate electrode of the second transistor is electrically coupled to the first source/drain electrode of the first transistor of a rear stage neighboring with the stage, the first source/drain electrode of the second transistor is electrically coupled to the predetermined potential, and the second source/drain electrode of the second transistor is electrically coupled to both the gate electrode and the first source/drain electrode of the first transistor of the stage.

25. The display device as claimed in claim 24, wherein each of the stages of the first and second gate driving circuits further comprises a third transistor, the first source/drain electrode of the third transistor is electrically coupled to the gate electrode of the first transistor of the stage, and both the gate electrode and the second source/drain electrode of the third transistor are electrically coupled to the first source/drain electrode of the first transistor of a front stage neighboring with the stage.

26. The display device as claimed in claim 22, wherein the repair circuit comprises a fourth transistor, the gate electrode of the fourth transistor acts as one control terminal of the repair circuit, the first source/drain electrode of the fourth transistor acts as the second terminal of the repair circuit, and the second source/drain electrode of the fourth transistor acts as the first terminal of the repair circuit.

27. The display device as claimed in claim 26, wherein the amount of the at least one repair signal is one, and the one repair signal is a direct current signal.

28. The display device as claimed in claim 26, wherein the amount of the at least one repair signal is one, and the one repair signal is an alternating current signal.

29. The display device as claimed in claim 22, wherein the repair circuit comprises a fifth transistor and a sixth transistor, the gate electrodes of the fifth and sixth transistors act as two control terminals of the repair circuit, the first source/drain electrodes of the fifth and sixth transistors are electrically coupled to the second terminal of the repair circuit, and the second source/drain electrodes of the fifth and sixth transistors are electrically coupled to the first terminal of the repair circuit.

30. The display device as claimed in claim 29, wherein the amount of the at least one repair signal are two, and the two repair signals respectively are two clock pulse signals having inverted phases with respect to each other.

* * * * *